Patented Jan. 16, 1934

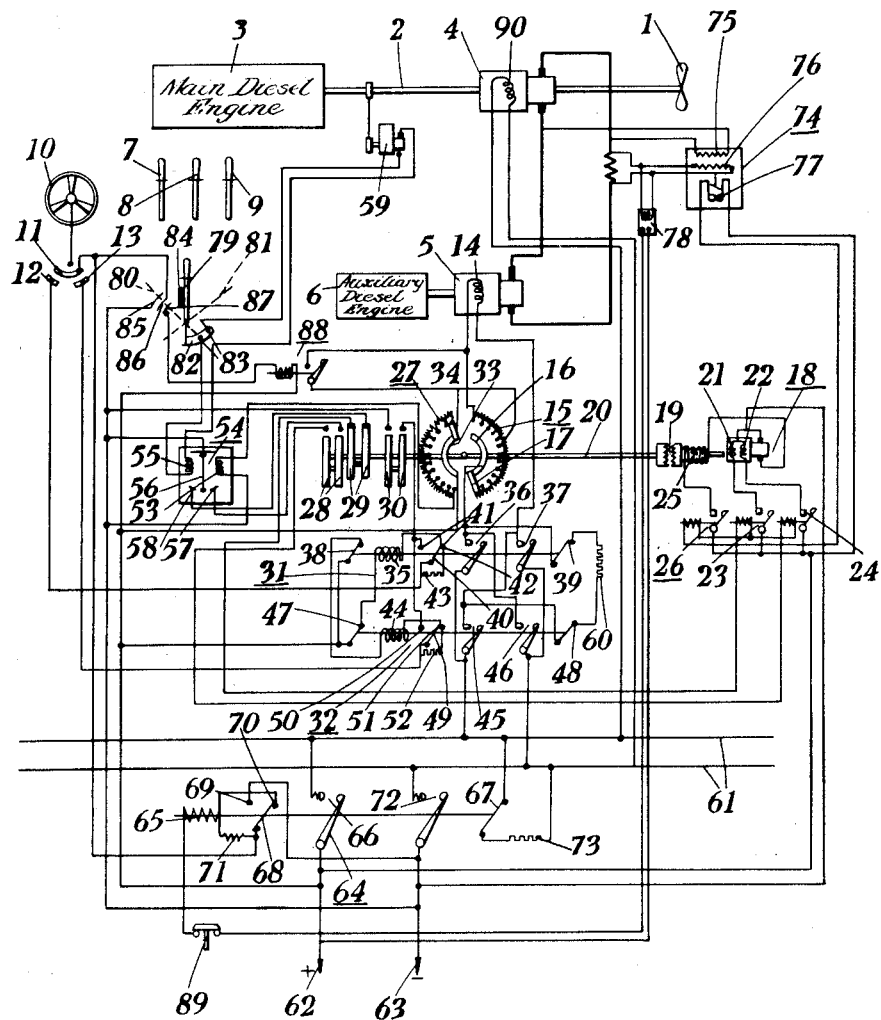

1,943,369

UNITED STATES PATENT OFFICE 1,943,369

CONTROL SYSTEM FOR POWER PLANTS COMPRISING ELECTRIC MOTORS AND PRIME MOVERS

Herbert John Coates, Erdington, Birmingham, England, assignor to The General Electric Company, Limited, London, England Application November 30, 1932, Serial No. 644,944, and in Great Britain December 3, 1931

7 Claims. (Cl. 172—8)

This invention relates to control systems for power plants comprising electric motors adapted together with prime movers to drive ship propeller shafts or other variable speed loads. In such a system it is desirable that changes in speed should not cause sudden or large changes in the proportions in which the prime mover and the motor share the load. For example suppose that the motor has constant field excitation and is supplied with power at constant voltage and the speed of the prime mover is increased by increasing the fuel input, then there will be a rise in the back E. M. F. of the motor and a consequent fall in the power output of the motor so that the prime mover will have to supply more than its fair share of the load. In order to ensure that the portions of the total power supplied by the prime mover and the motor respectively shall be maintained at suitable values after such an increase in speed, it therefore becomes necessary to regulate the power output of the motor, for example by decreasing the field excitation of the motor or by increasing the voltage of the power supply to the motor. It is however inconvenient to have to effect a separate regulation of the motor output after each change of speed, furthermore the necessary regulation cannot be readily effected by movement of a lever controlling the speed of the prime mover since the position of the control lever does not necessarily have a direct relation to the speed of the prime mover and also the range of movement of the lever over the whole speed range is usually small. The object of the present invention is to provide a system in which the necessary regulation of the motor output is readily effected upon change of speed.

According to the present invention, the necessary regulation of the power output of the motor upon a change of speed of the load is automatically effected by a device driven at the speed of the load or at a speed proportional thereto.

The prime mover may be an internal combustion engine and the motor, which may be supplied with power from a direct current generator driven at constant speed and arranged for field control, may be adapted to start the engine.

The automatic regulating means may comprise a differential relay the excitation of one coil of which is a function of the speed of the load and the excitation of another coil of which is a function of the position of means for adjusting the power supplied by the motor.

Preferably when the motor is supplied with power from a constant speed direct current generator the excitation of the said other coil of the differential relay is a function of the field excitation of the said generator. The said field excitation may be controlled by a motor driven regulator the motor of which also drives a second regulator arranged to control the excitation of the said other coil of the differential relay and the forward and reverse operation of the regulators may be controlled by the differential relay.

The operation of the motor alone to drive the load or to start up or to reverse the prime mover is controlled by a lever or like member. Furthermore it may be arranged for the movement of the said lever or the like member to a "stop" position to enable the power supplied to the motor to be reduced independently of the speed of the load whereby the power may finally be reversed to assist in stopping the prime mover.

The invention will now be described, by way of example, with reference to the accompanying diagrammatic drawing, which shows a control system for ship propulsion plant.

As shown a propeller 1 is driven by a main Diesel engine 3 through a shaft 2, on which is arranged a direct current motor 4 for supplying additional power to the propeller 1 and for starting up the main Diesel engine. The motor 4 is supplied with power from a direct current generator 5 driven by a constant speed auxiliary Diesel engine 6. The main Diesel engine 3 is provided with an air lever 7, a fuel lever 8, a speed lever 9 for regulating the speed and a reversing wheel 10: the reversing wheel 10 serves to reverse the cams of the engine and also serves to connect a segment 11 with a segment 12 or a segment 13 according as the wheel is in the "Ahead" as "Astern" position.

The generator 5 has a shunt field 14 the excitation of which is controlled by a regulator 15, which comprises a series resistance provided with a plurality of taps adapted to be connected in turn to a segment 16 by a moving contact 17.

The regulator 15 is operated by means of a motor 18 through a clutch 19 and shaft 20, which rotates the contact 17 over the segment 16 and the taps of the regulator 15. The motor 18 has forward and reverse fields 21 and 22 energized by closure of contactors 23 and 24 respectively. The clutch 19 is engaged by energization of a coil 25 by closure of a contactor 26.

In addition to the regulator 15 the shaft 20 also operates a second regulator 27, limit segments 28 and 29 associated with the motor 18, and segments 30 associated with forward and reverse generator field contactors 31 and 32, the segments being of the drum type. The regulator 27 is similar to the regulator 15 and comprises a series resistance provided with a plurality of taps adapted to be connected in turn to a segment 33 by a moving contact 34, which is rotated by the shaft 20. The two regulators 15 and 27 are so arranged that they both cut in together and cut out together.

The forward generator field contactor 31 comprises an operating coil 35, normally open main contacts 36 and 37, normally closed interlock contacts 38, normally closed auxiliary discharge contacts 39 and two way contacts 40, 41 and 40, 42, the contacts 40, 42 normally short circuiting an economy resistance 43. The reverse generator field contactor 32 comprises an operating coil 44, normally open main contacts 45 and 46, normally closed interlock contacts 47, normally closed auxiliary discharge contacts 48 and two way contacts 49, 50 and 49, 51, the contacts 49, 51 normally short circuiting an economy resistance 52. A generator field discharge resistance 60 is connected across the contacts 39 and 48.

The regulator 27 controls the excitation of a coil 53 of a differential relay 54, which has a second coil 55 and a moving contact 56 adapted to engage one or other of two contacts 57 and 58. When the currents in the two coils 53 and 55 are equal the relay 54 is balanced and the moving contact rests mid-way between the contacts 57 and 58, making contact with neither. When however the current in the coil 55 exceeds the current in the coil 53 the contact 56 engages the contact 58, similarly when the current in the coil 53 exceeds the current in the coil 55 the contact 56 engages the contact 57. The contacts 58 and 57 control the forward and reverse operation of the motor 18. The coil 55 is excited from a magneto-generator 59 which is chain driven from the shaft 2 so that the excitation of the coil 55 is proportional to the speed of the shaft 2.

The motor and generator field excitation is obtained from bus bars 61 adapted to be energized from supply leads 62 and 63 by closures of a contactor 64. The contactor 64 comprises an operating coil 65, normally open main contacts 72 and 66 normally closed auxiliary contacts 67 for connecting a discharge resistance 73 across the bus bars 61, and two way contacts 68, 69 and 68, 70, the contacts 68, 70 normally short circuiting an economy resistance 71.

In order to prevent the power flowing to or from the motor 4 becoming excessive an over power and over reverse power relay 74 is provided. This relay 74 has a volt coil 75, a current coil 76 and a pair of normally closed contacts 77, which when power flow to or from the motor 4 rises above a predetermined value open to prevent operation of the motor 18. An over current relay 78 effects tripping of the contactor 64 in the event of the current flow between the generator 5 and the motor 4 rising above a predetermined value.

The starting, stopping and reversing of the motor 4 is normally controlled by a lever 79 which is spring biased to a "Neutral" position in which it is shown, but which may be moved against the action of the spring either to a "Start" position, as represented by the broken line 80, or to a "Stop" position, as represented by the broken line 81. The lever 79 carries a contact 82 adapted to bridge two contacts 83 and to disengage these contacts only when the lever 79 is in the "Stop" position 81 and thereby to interrupt the circuit between the magneto-generator 59 and the coil 55 of the differential relay 54. The lever 79 also carries a contact 84 which bridges three contacts 85, 86 and 87 when the lever is in the "Start" position 80. The segment 87 is connected to the operating coil of a contactor 88 closure of which short circuits part of the regulator resistance 15.

In order to start up the main Diesel engine 3 in the ahead direction, the auxiliary Diesel engine 6 running at constant speed and the regulators being in the positions shown with their resistances all in circuit, the reversing wheel 10 is set to its "Ahead" position and the lever 79 is held in the "Start" position 80. A circuit may then be traced as follows:—Supply lead 63, contacts 85, 84 and 86 of lever 79, contacts 68 and 70 of contactor 64, operating coil 65 of contactor 64, contacts of an emergency stop 89, contacts of the over current relay 78, supply lead 62. Contactor 64 therefore closes and energizes the bus bars 61 and at the same time closes contacts 68, 69 to complete a retaining circuit from the supply lead 63, through contacts 69 and 68 of the contactor 64 and economy resistance 71 to the operating coil 65. Energization of the bus bars 61 excites the field 90 of the motor 4.

Another circuit may be traced as follows:— Supply lead 63, contacts 85, 84 and 87 of lever 79, operating coil of contactor 88, supply lead 62. Contactor 88 therefore closes and short circuits part of the regulator resistance 15.

A third circuit may be traced as follows:— Supply lead 63, contacts 85, 84 and 86 of lever 79, segments 11 and 12 of the reversing wheel 10, contacts 40 and 42 of the forward generator field contactor 31, operating coil 35 of contactor 31, interlock contacts 47 of contactor 32, supply lead 62. Contactor 31 therefore closes and completes a circuit to excite the generator 5 from the bus bars 61 through contacts 36, regulator 15, generator field 14 and contacts 37. At the same time interlock contacts 38 open to prevent operation of contactor 32. Since part of the regulator resistance 15 is short circuited by the contactor 88 the voltage of the generator 5 builds up rapidly and starts the motor 4, which rotates the shaft 2 and engine 3.

A circuit may be traced from the magneto-generator 59 through the coil 55 of the differential relay 54 and contacts 82 and 83 of the lever 79. A circuit may also be traced from the supply lead 62 through segment 33, contact 34 and the total resistance of the regulator 27 and the coil 53 of the differential relay 54 to the supply lead 63. The coil 53 is therefore weakly excited. Meanwhile the excitation of the coil 55 increases as the speed of the shaft 2 increases until finally the differential relay operates to close contacts 56 and 58. A circuit may then be traced as follows:—Supply lead 63, contacts 56 and 58 of relay 54, limit segments 29, operating coils of contactors 23 and 26, contacts 77 of over power relay 74, supply lead 62. Contactors 26 and 23 therefore close, the one completing a circuit through the operating coil 25 of the clutch 19 and the armature of the motor 18 and the other completing a circuit through the forward field 21 of the motor 18. The motor 18 now proceeds to drive the regulators 15 and 27 in the forward direction, that is so that the contacts 17 and 34 are rotated in a counter-clockwise direction. The regulator resistance 15 is thus slowly cut out and the voltage of the generator 5 is increased. In the event of the generator voltage rising too rapidly contacts 77 of the over power relay 24 open to deenergize the contactors 23 and 26 and thereby stop the motor 18 until the power supplied by the generator 5 has fallen.

When the engine 3 is up to firing speed fuel is admitted and when the engine fires the lever 79 is released and returns to the "Neutral" position thereby allowing the contactor 88 to fall open. A retaining circuit for the contactor 31 is now completed as follows:—Supply lead 63, segments 30, contacts 41, 40 of the contactor 31, economy resistance 43, operating coil 35 of contactor 31.

Operation of the motor 18 also operates the regulator 27 to cut out its resistance, thereby increasing the excitation of the coil 53 of the relay 54 until the relay is balanced and the contact 56 breaks contact with contact 58 and returns to its mid position; the contactors 26 and 23 therefore fall open and the regulators 15 and 27 come to rest. So long as the relay 54 is in its balanced position the engine 3 and the motor 4 are each supplying their correct share of the total load.

If the speed of the engine 3 is now increased by movement of the lever 9, the speed of the magneto-generator 59 and so the excitation of the coil 55 of the relay 54 is also increased until the relay 54 again operates to close its contacts 56 and 58. The motor 18 is again started up in the forward direction to drive the regulator 15 to cut out its resistance to increase the voltage of the generator 5 and the regulator 27 to cut out its resistance to increase the excitation of the coil 53 of the relay 54. When the excitation of the coil 53 has risen to that of the coil 55 the relay returns to its balanced position and the regulators 15 and 27 are brought to rest in their new positions.

If the lever 9 is operated to reduce the speed of the engine 3 the load of the propeller will be in excess of that which the generator can supply at the voltage setting and the propeller 1 and shaft 2 will slow down. The reduction of speed of the magneto-generator 59 causes a reduction in the excitation of the coil 55 until the relay 54 operates to close contacts 56 and 57. A circuit is then completed as follows:—Supply lead 63, contacts 56 and 57 of relay 54, limit segments 28, operating coils of contactors 24 and 26, contacts 77 of over power relay 74, supply lead 62. The reverse field 22 of the motor 18 is therefore energized by closure of the contactor 24 and the motor starts up to drive the regulators 15 and 27 in the reverse direction. The regulator 15 cuts in its resistance and thereby reduces the voltage of the generator 5 while the regulator 27 cuts in its resistance and reduces the excitation of the coil 53 until the relay 54 again returns to its balanced position and the regulators 15 and 27 are brought to rest.

Stopping is normally performed by cutting off fuel from the engine 3, the regulator 15 automatically adjusting itself under the control of the differential relay 54 until the propellers stop as the ship loses way. The regulator 15 is finally brought to rest in the position shown by the interruption at the limit segments 28 of the circuit to the contactors 24 and 26 and the generator field 14 deenergized by opening of contactor 31 due to the interruption at segments 30 of the circuit through coil 35 of contactor 31.

If it is desired to stop the propeller rapidly the power supply to the motor 4 can be reversed. To do this the lever 79 is held in the "Stop" position 81 thus interrupting the circuit to the coil 55 of the relay 54 at contacts 82 and 83 and deenergizing the coil 55 so that the relay 54 operates under the influence of the coil 53 to close contacts 56 and 57. The motor 18 is thereby started up to drive the regulator 15 to cut in its resistance and reduce the voltage of the generator 5. When the generator voltage reaches zero, or other predetermined low value (shown on a voltmeter) and the segments 30 have interrupted the circuit to the coil 35 of contactor 31 the lever 79 is released, the reversing wheel 10 is moved to the "Astern" position and the lever 79 is held in the "Start" position 80. A circuit is completed through segments 11 and 13 of the reversing wheel 10 and the operating coil 44 of the reverse contactor 32, which closes to excite the field 14 of the generator 5 in the reverse direction. When the propeller has come to rest the lever 79 is released and returns to the "Neutral" position allowing the contactor 32 to fall open. If during the rapid stopping of the propeller the power flow between the motor 4 and generator 5 becomes excessive the over power relay 74 operates to stop the motor 18. The relay 74 is set so that it will only operate during the starting and stopping of the motor 4 and not during ordinary speed variations under the control of the lever 9. If the current in the circuit between the motor 4 and the generator 5 at any time rises to an excessive value the over current relay 78 interrupts the circuit through the coil 65 of the contactor 64, which falls open and deenergizes the motor field 90 and the generator field 14, the discharge resistance 73 at the same time being connected across the fields 90 and 14. The contactor 64 may also be opened by pressing the emergency stop 89.

The operation in the reverse direction is effected by moving the reversing wheel 10 to the "Astern" position and operating the lever 79 in a similar manner to that already described for forward operation, the reverse contactor 32 now being closed instead of the forward contactor 31.

Rapid reversals may be effected by stopping the propeller rapidly in the manner described above and retaining the lever 79 in the "Start" position 80 until the motor 4 reverses and runs up to firing speed.

The invention may of course be carried out in various ways and in a modified arrangement the regulator controlling the field strength of the generator is operated directly by a device driven by the propeller shaft to effect the required regulation of the power output of the motor. The device comprises a member driven at the speed of the shaft or a speed proportional thereto and associated by means of a slipping coupling with a second member which is biased to a predetermined position. The coupling between the two members is such that a torque is applied to the second member and tends to rotate it against the biasing force, the torque being a function of and increasing with the speed of the first member. The biasing force exerts a torque which is a function of and increases with the displacement of the second member from the predetermined position, the second member therefore takes up a position dependent on the speed of the shaft and the movements of the second member operate the field regulator. The slipping coupling between the two members may comprise an eddy current electric coupling, the second member being biased by a spring to a central or neutral position.

I claim:—

1. A control system for a power plant driving a variable speed load, comprising a prime mover and an electric motor operating jointly to drive the load, each carrying a prearranged portion of the load, means for varying the speed of the prime mover, automatic means brought into operation by a change of speed of the prime mover for regulating the power output of the motor so that the latter will at all times carry a prearranged proportion of the load.

2. A control system for a power plant driving a variable speed load, comprising an electric motor and a prime mover jointly operating to carry the load, each carrying a prearranged portion thereof, means for supplying current to the motor, means for varying the speed of the prime mover according to the load requirements, means controlled by the speed of the load for automatically varying the supply of current to the motor to vary the power output thereof, the arrangement being such that the proportion of the load carried by the motor is maintained substantially constant.

3. A power plant for driving a variable speed load, such as a ship propeller shaft, comprising an electric motor, means for coupling the electric motor to the load, means for supplying current to the electric motor, a prime mover, means for coupling the prime mover to the load to operate the same jointly with the motor, means for varying the speed of the prime mover, a regulator for varying the supply of current to the motor to vary the power output thereof, rotary means operated by the load for controlling operation of the regulator to vary the power output of the motor and means for driving said rotary means from the load at a speed in proportion to the speed of the load, the arrangement being such that the motor and prime mover constantly supply prearranged proportions of the power supplied to the load.

4. A power plant for driving a variable speed load, such as a ship propeller shaft, comprising a prime mover, means for coupling the prime mover to the load, a direct current electric motor, means for coupling said motor to the load, said prime mover and the motor operating jointly to carry the load, means for varying the speed of the prime mover, an electric generator arranged to supply current to the motor, means for driving the generator at constant speed, regulating means for varying the current delivered by the generator and means operated by the load at a speed proportional to the speed of the load for operating said regulating means to increase the current output of the load upon an increase of speed and to decrease said current output upon a decrease of speed.

5. In a power plant comprising an electric motor operating jointly with a prime mover to drive a variable speed load, such as a ship propeller shaft, a control system for maintaining the proportions of the total power supplied by the motor and the prime mover at substantially prearranged values, comprising means for varying the speed of the prime mover, a regulator for regulating the power output of the motor, means for operating said regulator, a differential relay provided with two coils for controlling said regulator operating means to increase and decrease the power output of the motor, means for supplying one of said coils with current varying with the speed of the load, means for operating said current supplying means from the load, means for supplying the other relay coil with current from an independent source, the amount of which is controlled by the position of said regulator and means for operating the latter current controlling means jointly with and in dependence upon the position of said regulator, the arrangement being such that when the differential relay is balanced by equal currents in said coils the load is proportioned as prearranged between the prime mover and the motor.

6. In a power plant comprising an electric motor operating jointly with the prime mover to drive a variable speed load, such as a ship propeller shaft, a control system for maintaining the relative proportions of the total power supplied by the motor and the prime mover at substantially prearranged values, comprising means for varying the speed of the prime mover, a direct current electric generator for supplying current to the motor, means for driving the generator at constant speed, a field regulator for controlling the excitation of the generator to vary the supply of current to the motor, an independently operated motor for operating said regulator, means controlled by the load and responsive to the speed thereof for starting the motor of the field regulator upon a change of speed of the load and means for stopping said motor when the excitation of the generator has altered the amount of current to the motor driving the load so that the latter again supplies its prearranged proportion of the total power driving the load.

7. A power plant for driving a variable speed load, such as a ship propeller shaft, comprising a direct current electric motor, means for coupling the electric motor to the load, a prime mover, means for coupling the prime mover to the load for operation jointly with the motor, means for varying the speed of the prime mover, a direct current electric generator for supplying current to the motor, a second prime mover arranged to drive the generator at constant speed, a field regulator for controlling the excitation of the generator to vary the current supplied to the motor, an independent motor for driving said regulator, current operated control means for controlling the starting and stopping of the regulator motor, a second generator driven by the first prime mover for supplying current to said current operated control means in proportion to the speed of the load, variation in said current controlling operation of the control means to start said regulator motor, means for supplying an independent current to said control means, which current is adapted to control operation of the control means to stop the regulator motor, and a second regulator driven by the motor driving the first regulator and arranged to vary said independent current to the control means so as to stop said regulator motor when the first regulator has reached a predetermined position.

HERBERT JOHN COATES.